(12) United States Patent
Kawato et al.

(10) Patent No.: US 11,966,645 B2
(45) Date of Patent: Apr. 23, 2024

(54) DOCUMENT CREATION METHOD, INFORMATION PROCESSING DEVICE AND NON-TRANSITORY COMPUTER-READABLE MEDIUM

(71) Applicant: LegalOn Technologies, Inc., Tokyo (JP)

(72) Inventors: Takashi Kawato, Tokyo (JP); Ruka Funaki, Tokyo (JP)

(73) Assignee: LEGALON TECHNOLOGIES, INC., Tokyo (JP)

(*) Notice: Subject to any disclaimer, the term of this patent is extended or adjusted under 35 U.S.C. 154(b) by 0 days.

(21) Appl. No.: 17/929,636

(22) Filed: Sep. 2, 2022

(65) Prior Publication Data

US 2022/0413783 A1 Dec. 29, 2022

Related U.S. Application Data

(63) Continuation of application No. PCT/JP2020/009304, filed on Mar. 5, 2020.

(51) Int. Cl.
*G06F 3/12* (2006.01)

(52) U.S. Cl.
CPC .......... *G06F 3/1254* (2013.01); *G06F 3/1203* (2013.01); *G06F 3/1204* (2013.01)

(58) Field of Classification Search
CPC .... G06F 3/1254; G06F 3/1203; G06F 40/186; G06Q 10/10

USPC ......................................................... 358/1.18
See application file for complete search history.

(56) References Cited

U.S. PATENT DOCUMENTS

| 6,104,381 | A | * | 8/2000 | Watanabe | ............... G06F 3/018 345/472.3 |
| 2005/0071630 | A1 | * | 3/2005 | Thornton | ............... H04L 9/3226 713/156 |
| 2014/0172684 | A1 | * | 6/2014 | Wolfe, Jr. | ............... G06Q 10/10 705/38 |
| 2017/0024695 | A1 | * | 1/2017 | Wolfe, Jr. | ............... G06Q 50/08 |

FOREIGN PATENT DOCUMENTS

| JP | 2014-160486 A | 9/2014 |
| JP | 2016-212533 A | 12/2016 |
| JP | 2019-212115 | 12/2019 |
| JP | 6640395 | 2/2020 |

OTHER PUBLICATIONS

PCT International Search Report issued in PCT Application No. PCT/JP2020/009304, mailed from the Japan Patent Office dated May 26, 2020.

* cited by examiner

*Primary Examiner* — Darryl V Dottin
(74) *Attorney, Agent, or Firm* — FINNEGAN, HENDERSON FARABOW, GARRETT & DUNNER LLP

(57) ABSTRACT

A document creation method includes: specifying a missing unit in document information divided into units; and specifying a unit serving as a reference for inserting the missing unit.

20 Claims, 9 Drawing Sheets

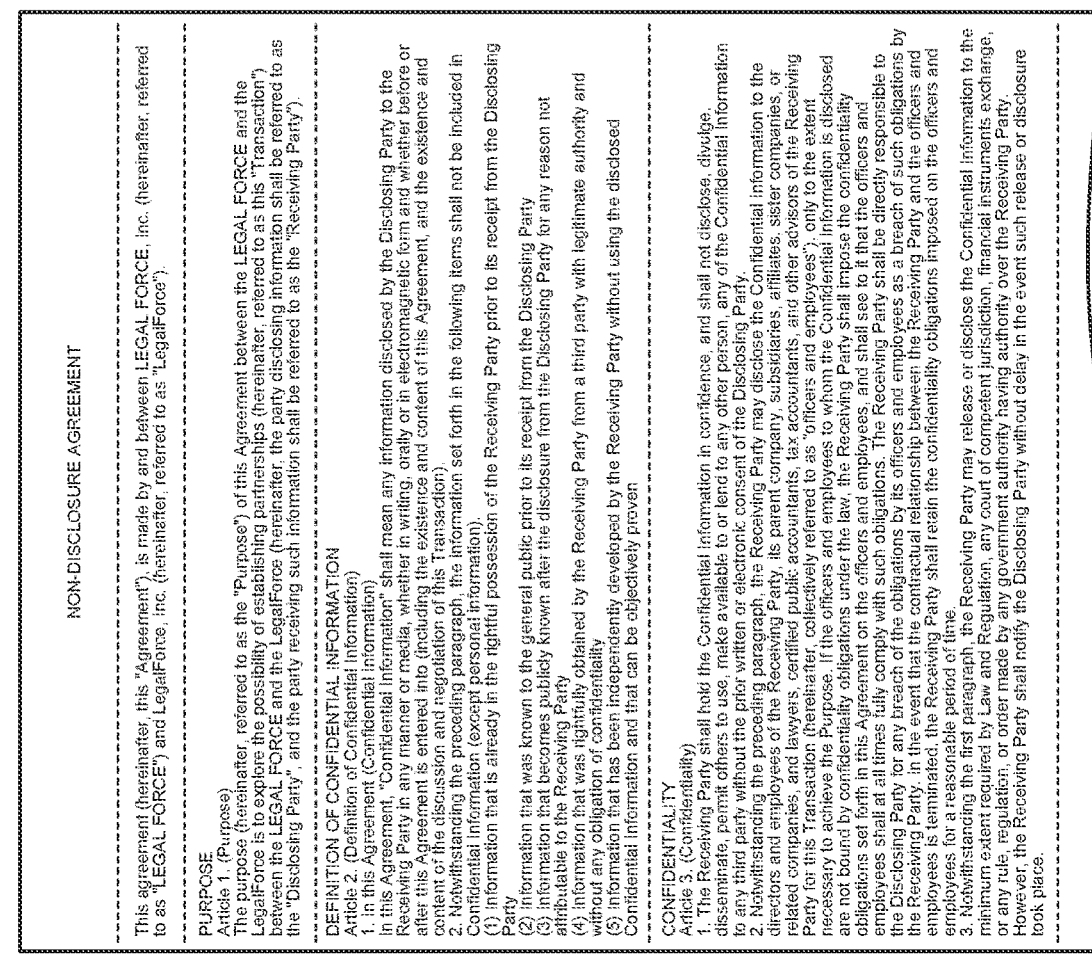

FIG.4

NON-DISCLOSURE AGREEMENT

This agreement (hereinafter, this "Agreement"), is made by and between LEGAL FORCE, Inc. (hereinafter, referred to as "LEGAL FORCE") and LegalForce, Inc. (hereinafter, referred to as "LegalForce").

PURPOSE
Article 1. (Purpose)
The purpose (hereinafter, referred to as the "Purpose") of this Agreement between the LEGAL FORCE and the LegalForce is to explore the possibility of establishing partnerships (hereinafter, referred to as this "Transaction") between the LEGAL FORCE and the LegalForce (hereinafter, the party disclosing information shall be referred to as the "Disclosing Party," and the party receiving such information shall be referred to as the "Receiving Party").

DEFINITION OF CONFIDENTIAL INFORMATION
Article 2. (Definition of Confidential Information)
1. In this Agreement, "Confidential Information" shall mean any information disclosed by the Disclosing Party to the Receiving Party in any manner or media, whether in writing, orally or in electromagnetic form and whether before or after this Agreement is entered into (including the existence and content of this Agreement, and the existence and content of the discussion and negotiation of this Transaction).
2. Notwithstanding the preceding paragraph, the information set forth in the following items shall not be included in Confidential Information (except personal information).
(1) Information that is already in the rightful possession of the Receiving Party prior to its receipt from the Disclosing Party
(2) Information that was known to the general public prior to its receipt from the Disclosing Party
(3) Information that becomes publicly known after the disclosure from the Disclosing Party for any reason not attributable to the Receiving Party
(4) Information that was rightfully obtained by the Receiving Party from a third party with legitimate authority and without any obligation of confidentiality
(5) Information that has been independently developed by the Receiving Party without using the disclosed Confidential Information and that can be objectively proven CONFIDENTIALITY
Article 3. (Confidentiality)
1. The Receiving Party shall hold the Confidential Information in confidence, and shall not disclose, divulge, disseminate, permit others to use, make available to or lend to any other person, any of the Confidential Information to any third party without the prior written or electronic consent of the Disclosing Party.
2. Notwithstanding the preceding paragraph, the Receiving Party may disclose the Confidential Information to the directors and employees of the Receiving Party, its parent company, subsidiaries, affiliates, sister companies, or related companies, and lawyers, certified public accountants, tax accountants, and other advisors of the Receiving Party for this Transaction (hereinafter, collectively referred to as "officers and employees"), only to the extent necessary to achieve the Purpose. If the officers and employees to whom the Confidential Information is disclosed are not bound by confidentiality obligations under the law, the Receiving Party shall impose the confidentiality obligations set forth in this Agreement on the officers and employees, and shall see to it that the officers and employees shall at all times fully comply with such obligations. The Receiving Party shall be directly responsible to the Disclosing Party for any breach of the obligations by its officers and employees as a breach of such obligations by the Receiving Party. In the event that the contractual relationship between the Receiving Party and the officers and employees is terminated, the Receiving Party shall retain the confidentiality obligations imposed on the officers and employees for a reasonable period of time.
3. Notwithstanding the first paragraph, the Receiving Party may release or disclose the Confidential Information to the minimum extent required by Law and Regulation, any court of competent jurisdiction, financial instruments exchange, or any rule, regulation, or order made by any government authority having authority over the Receiving Party. However, the Receiving Party shall notify the Disclosing Party without delay in the event such release or disclosure took place.

PROHIBITION OF USE FOR OTHER PURPOSES
Article 4. (Prohibition of Use for Other Purposes)
The Receiving Party shall not use the Confidential Information disclosed by the Disclosing Party for any purpose except for the Purpose.

| PURPOSE | DEFINITION OF CONFIDENTIAL INFORMATION | EXCEPTION OF CONFIDENTIAL INFORMATION | CONFIDENTIALITY OBLIGATIONS | DISCLOSURE TO THIRD PARTY | LEGAL DISCLOSURE | PROHIBITION OF RE-PRODUCTION | PROHIBITION OF USE FOR OTHER PURPOSES |
|---|---|---|---|---|---|---|---|
| Label A | Label B | Label C | Label D | Label E | Label F | Label G | Label H |
| ✓ | | | | | | | |
| | | ✓ | | | | | |
| | | | ✓ | ✓ | ✓ | | |
| | | | | | | | ✓ |

FIG. 6

| | Label A | Label B | Label C | ... | Label F | Label G | Label H | ... |
|---|---|---|---|---|---|---|---|---|
| Label A | - | 2 | 5 | ... | 6 | 8 | 9 | ... |
| Label B | 2 | - | 1 | ... | 4 | 5 | 8 | ... |
| Label C | 5 | 1 | - | ... | 9 | 3 | 4 | ... |
| ... | ... | ... | ... | ... | ... | ... | ... | ... |
| Label F | 6 | 4 | 9 | ... | - | 4 | 10 | ... |
| Label G | 8 | 5 | 3 | ... | 4 | - | 1 | ... |
| Label H | 9 | 8 | 4 | ... | 10 | 1 | - | ... |

FIG. 7

| | Label A | Label B | Label C | ... | Label F | Label G | Label H | ... |
|---|---|---|---|---|---|---|---|---|
| Label A | - | MID | BELOW | ... | MID | | | |
| Label B | MID | - | ABOVE | ... | BELOW | | | |
| Label C | BELOW | ABOVE | | ... | | | | |
| ... | ... | ... | ... | ... | ... | ... | ... | ... |
| Label F | MID | BELOW | BELOW | ... | | | | |
| Label G | | | | ... | | | ABOVE | |
| Label H | | | | ... | | | | BELOW |
| ... | | | | | | | | |

DOCUMENT CREATION METHOD, INFORMATION PROCESSING DEVICE AND NON-TRANSITORY COMPUTER-READABLE MEDIUM

CROSS-REFERENCE TO RELATED APPLICATIONS

This application is a continuation of International Application No. PCT/JP2020/009304, filed on Mar. 5, 2020, the entire contents of which are incorporated herein by reference.

FIELD

The present disclosure relates to a document creation program and an information processing device.

BACKGROUND

Conventionally, an information processing device that inspects the description contents of a contract has been proposed (for example, see Japanese Patent Application Laid-open No. 2019-212115).

The information processing device disclosed in Japanese Patent Application Laid-open No. 2019-212115 stores model data of each of a plurality of clauses, determines a part corresponding to the clause in a contract received as an object to be inspected, extracts a part that requires attention on the basis of a difference between the model data that corresponds to each of the clauses and the text in each clause of the contract, outputs the part that requires attention, specifies the clause not included in the contract, and outputs a template of the specified clause.

Although the information processing device disclosed in Japanese Patent Application Laid-open No. 2019-212115 described above specifies the clause not included in the contract and outputs a template of the specified clause, there may be a problem in that the information processing device does not indicate in which part of the contract, which is an object to be inspected, the specified clause should be inserted.

SUMMARY

A document creation method includes: specifying a missing unit in document information divided into units; and specifying a unit serving as a reference for inserting the missing unit.

An object of one embodiment of the present disclosure is to provide a document creation method and an information processing device that, if there is missing information in a document, present information indicating where the missing information should be inserted.

One aspect of the present disclosure provides the following document creation method and information processing device to achieve the object described above.

(1) A document creation method including:
  specifying a missing unit in document information divided into units; and
  specifying a unit serving as a reference for inserting the missing unit.

(2) The document creation method according to (1), wherein
  the unit serving as the reference for inserting the missing unit is specified by referring to first insertion destination information in which the unit serving as the reference for inserting is defined in a relation between the missing unit and the units included in the document information, and
  the document creation method further includes determining a relative insertion position in which the missing unit is to be inserted, by referring to second insertion destination information in which the relative insertion position is defined according to a relation between the unit serving as the reference and the missing unit.

(3) The document creation method according to (3), wherein
  the first insertion destination information is information in which insertion priorities of units each serving as the reference for inserting are defined in the relation with the units included in the document information, and
  the unit serving as the reference for inserting the missing unit is specified according to the priorities, by referring to the first insertion destination information.

(4) The document creation method according to (4), wherein
  a plurality of units each serving as the reference for inserting are specified based on the insertion priorities, by referring to the first insertion destination information, and the relative insertion positions each defined according to one of the plurality units each serving as the reference for inserting are determined, and
  the document creation method further includes displaying combinations of the plurality of units each serving as the reference and the relative insertion positions.

(5) The document creation method according to (1), further including receiving a selection of the unit serving as the reference and the relative insertion position, and inserting the missing unit according to the selected unit serving as the reference and relative insertion position.

(6) The document creation method according to (1), wherein the specifying the missing unit includes assigning labels to the units into which the document information is divided.

(7) The document creation method according to (6), wherein a unit to which a label is not assigned is specified as the missing unit.

(8) The document creation method according to claim (6), further including proposing a unit to be inserted as the missing unit.

(9) An information processing device including:
  a processor configured to:
  specify a missing unit in document information divided into units; and
  specify a unit serving as a reference for inserting the missing unit.

(10) The information processing device according to (9), wherein the processor is configured to specify the missing unit, by referring to first insertion destination information in which the unit serving as the reference for inserting is defined in a relation between the missing unit and the units included in the document information, and determine a relative insertion position in which the missing unit is to be inserted, by referring to second insertion destination information in which the relative insertion position is defined according to a relation between the unit serving as the reference and the missing unit.

(11) The information processing device according to (10), wherein
  the first insertion destination information is information in which insertion priorities of units each serving as the reference for inserting are defined in the relation with the units included in the document information, and
  the processor is configured to specify the unit serving as the reference for inserting the missing unit according to the priorities, by referring to the first insertion destination information.

(12) The information processing device according to (11), wherein the processor is configured to specify a plurality of units each serving as the reference for inserting based on the insertion priorities, by referring to the first insertion destination information, and determine the relative insertion positions each defined according to one of the plurality units each serving as the reference for inserting, and the processor is further configured to display combinations of the plurality of units each serving as the reference and the relative insertion positions.

(13) The information processing device according to (9), wherein the processor is further configured to receive a selection of the unit serving as the reference and the relative insertion position, and insert the missing unit according to the selected unit serving as the reference and relative insertion position.

(14) The information processing device according to (9), wherein the processor is configured to assign labels to the units into which the document information is divided, to specify the missing unit.

(15) The information processing device according to (14), wherein the processor is configured to specify, as the missing unit, a unit to which a label is not assigned.

(16) The information processing device according to (14), wherein the processor is further configured to propose a unit to be inserted as the missing unit.

(17) A document creation method including:

assigning labels to article units into which document information is divided, to specify an absent clause in document information.

(18) The document creation method according to (17), wherein a unit to which no label is assigned is specified as the absent clause.

(19) The document creation method according to (17), further including proposing a clause to be inserted as the absent clause.

According to one embodiment of the present disclosure, if there is missing information in a document, it is possible to present information indicating where the missing information should be inserted.

According to one embodiment of the present disclosure, it is possible to specify the unit serving as the reference for inserting the missing unit according to the priorities, by referring to the first insertion destination information.

According to one embodiment of the present disclosure, it is possible to specify the plurality of units each serving as the reference for inserting based on the insertion priorities, by referring to the first insertion destination information, determine the relative insertion positions each defined by one of the plurality of units each serving as the reference for inserting, and display combinations of the plurality of units each serving as the reference and the relative insertion positions.

According one embodiment of the present disclosure, it is possible to receive a selection of the displayed unit serving as the reference and relative insertion position, and insert the missing unit according to the selected unit serving as the reference and relative insertion position.

According to one embodiment of the present disclosure, if there is missing information in a document, it is possible to present information indicating where the missing information should be inserted.

According to one embodiment of the present disclosure, it is possible to specify the unit serving as the reference for inserting the missing unit according to the priorities, by referring to the first insertion destination information.

According to one embodiment of the present disclosure, it is possible to specify the plurality of units each serving as the reference for inserting based on the insertion priorities, by referring to the first insertion destination information, determine the relative insertion positions each defined by one of the plurality of units each serving as the reference for inserting, and display combinations of the plurality of units each serving as the reference and the relative insertion positions.

According one embodiment of the present disclosure, it is possible to receive a selection of the displayed unit serving as the reference and relative insertion position, and insert the missing unit according to the selected unit serving as the reference and relative insertion position.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention

BRIEF DESCRIPTION OF THE DRAWINGS

FIG. 3 is a schematic diagram illustrating a configuration example of document information;

FIG. 4 is a schematic diagram for explaining an example of an inspection operation of document information;

FIG. 6 is a schematic diagram illustrating an example of a configuration of insertion destination information;

FIG. 7 is a schematic diagram illustrating an example of a configuration of insertion destination information;

DETAILED DESCRIPTION

Embodiment

Configuration of Document Creation System

Figure 1:
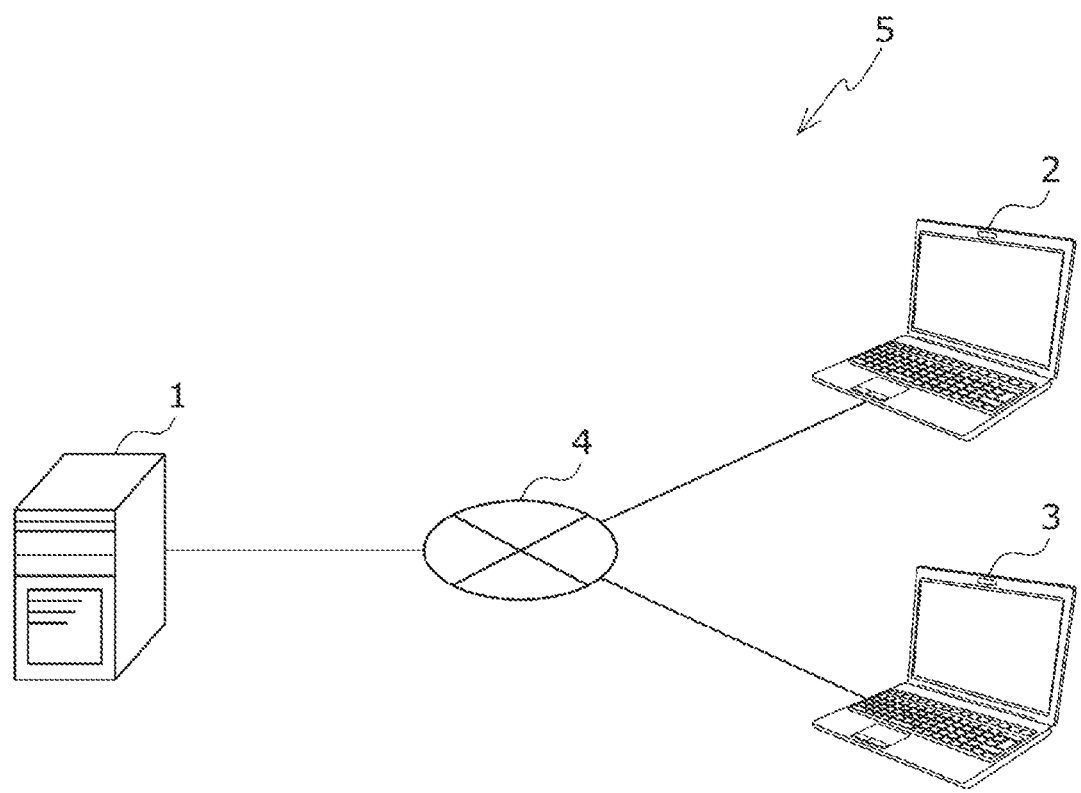
FIG. 1 is a schematic diagram illustrating an example of a configuration of a document creation system according to an embodiment.

FIG. 1 is a schematic diagram illustrating an example of a configuration of a document creation system according to an embodiment.

In a document creation system 5 of the embodiment, a document creation server device 1, a terminal 2, and a terminal 3 are communicably connected with each other via a network 4. For example, the terminal 2 may be operated by a client who requests to create and/or review a document, and the terminal 3 is operated by a mandatary who receives the request to create and/or review the document.

The document creation server device 1 of the embodiment is a server-type information processing device, and is operated in response to a request from the terminal 2 and the terminal 3. The main body of the document creation server device 1 may include electronic components such as a Central Processing Unit (CPU) having functions for processing information and a flash memory. The document creation server device 1 may be composed of a single information processing device, may be cooperatively operated by a plurality of the information processing devices, or may be operated by any cloud service. Moreover, all or a part of the functions of the document creation server device 1 may be implemented within the terminal 2 and/or terminal 3.

The terminal 2 and terminal 3 of the embodiment are information processing devices such as Personal Computers (PCs) and tablet terminals. The main body of the terminal 2 and terminal 3 may include electronic components such as a CPU having functions for processing information and a flash memory.

The network 4 may be a communication network capable of high-speed communication. For example, the network 4 may be a wired or wireless communication network such as the Internet, an intranet, and a Local Area Network (LAN).

In the above configuration, for example, a document to be created by the document creation server device 1 may be a document in the legal field such as a contract. A client may be a person who is not a legal expert but needs to draft a contract, and a mandatary may be a legal expert such as a lawyer who has knowledge in drafting contracts. Moreover, for example, the client may be an employee in the in-house sales department, and the mandatary may be an employee in the in-house legal department.

As an operation of the embodiment, the client may request the mandatary to review a contract, by first uploading document information from the terminal 2 to the document creation server device 1, and then transmitting the information on the request to the terminal 3 from the terminal 2 via the document creation server device 1. A contract reflecting the opinion of the client and the review result of the mandatary may be created, by editing the document information on the document creation server device 1 from the terminal 2 and the terminal 3. To reduce the workload of the mandatary or to support the client to create a contract by himself/herself, the document creation server device 1 of the embodiment inspects the document information when the document information is uploaded from the terminal 2.

The document creation server device 1 of the embodiment detects problems in the document information, that are, legal problems in the contract by inspection, and presents the detected problems to the client or mandatary. Specifically, if there is a missing (absent) clause in the document information, the document creation server device 1 of the embodiment presents the missing clause along with a position where the missing clause should be inserted. In the following, a clause is sometimes referred to as an "article". Hereinafter, the embodiment will be described.

The client described above may also be a legal expert who has knowledge of drafting contracts such as a lawyer or a person working in the in-house legal department, and the mandatary may be a person who is not a legal expert but needs to draft a contract. In this case, the mandatary may determine whether the contents of the contract drafted by the client are in line with the requirements of the mandatary. Moreover, the client and the mandatary may also belong to different companies, and use the document creation system 5 to reach a consensus on the contents of a contract between the companies and the like. In the drawing, the single terminal 2 and single terminal 3 are illustrated, but a plurality of the terminals 2 and terminals 3 may be connected to the network 4. Similarly, the terminals 2 and terminals 3 may be operated by a plurality of clients and mandataries.

Configuration of Document Creation Server Device

Figure 2:
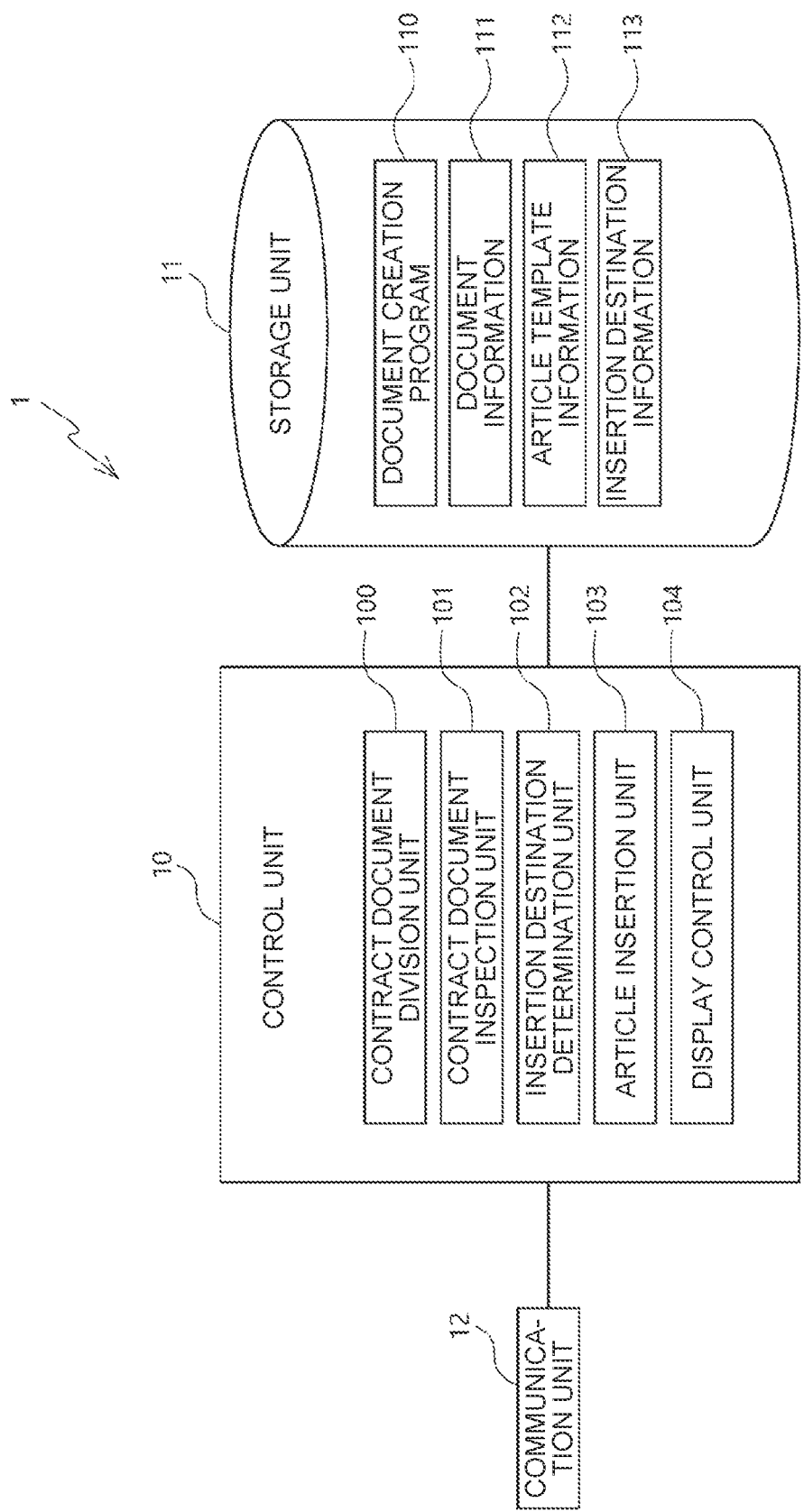
FIG. 2 is a block diagram illustrating a configuration example of a document creation server device according to the embodiment.

FIG. 2 is a block diagram illustrating a configuration example of the document creation server device 1 according to the embodiment.

The document creation server device 1 of the embodiment includes a control unit 10 that has a CPU and the like, that controls each unit, and that executes various computer programs; a storage unit 11 that includes a storage medium such as a flash memory and that stores information; and a communication unit 12 that communicates with the outside via the network 4.

By executing a document creation program 110 of the embodiment, which will be described below, the control unit 10 functions as a contract document division unit 100, a contract document inspection unit 101, an insertion destination determination unit 102, an article insertion unit 103, a display control unit 104, and the like.

The contract document division unit 100 of the embodiment divides document information 111 into components of a contract such as a title, a preface, and article units.

The contract document inspection unit 101 of the embodiment inspects the document information 111 that is divided into article units by the contract document division unit 100, by extracting the contents of the contract (non-disclosure agreement, outsourcing agreement, . . . ) and position of a user, and by comparing the contents and position with article template information 112 that is an article template corresponds to the contract, for example. The contract document inspection unit 101 of the embodiment then specifies an absent (missing) clause with respect to the article template information 112.

The insertion destination determination unit 102 of the embodiment determines the article serving as a reference when an absent article is to be inserted, and the insertion position relative to the article serving as a reference, based on the insertion destination information 113. In this example, the insertion destination information 113 includes first insertion destination information in which the article serving as a reference for inserting may be defined in the relation between a missing article in the object to be inspected and the article included in the object to be inspected, and second insertion destination information in which the relative insertion position may be defined according to the relation between the article serving as a reference and the missing article.

The article insertion unit 103 of the embodiment inserts an absent clause in the insertion position determined by the insertion destination determination unit 102.

The display control unit 104 of the embodiment controls the display of the document information 111, the article template information 112, and the insertion destination information 113 of the storage unit 11, as well as the output results of the units 100 to 103 on the display units of the terminal 2 and the terminal 3 in a predetermined method. The details of the display method of the document information 111, the article template information 112, and the insertion destination information 113, as well as the output results of the units 100 to 103 will be described below.

The storage unit 11 of the embodiment stores the document creation program 110, the document information 111, the article template information 112, the insertion destination information 113, and the like for operating the control unit 10 as each of the units 100 to 104 described above.

FIG. 3 is a schematic diagram illustrating a configuration example of the document information 111.

For example, document information 111a may be a contract, and include a title 100a, a preface 100b, and a plurality of article units 100*c*, 100*d*, 100*e*, . . . subsequent to the title 100*a* and the preface 100*b*, of the contract.

Operation of Document Creation System

Next, an operation of the first embodiment will be described.

First, the client may operate the terminal 2 to login to the service provided by the document creation server device 1. Upon receiving an input of information such as a user ID and password from the client, the terminal 2 may transmit an authentication request to the document creation server device 1 along with the information.

Upon receiving the authentication request from the terminal 2 along with the information such as the user ID and password, the document creation server device 1 may refer to the user information including the user ID, password, and the like registered in advance, and authenticates the client as a user.

Next, after having logged into the service, the client may operate the terminal 2 to upload the document information of the contract requested to be reviewed, to the document creation server device 1. The terminal 2 may upload the document information to the document creation server device 1.

The document creation server device 1 may receive the document information 111 from the terminal 2 operated by the client, and may store the received document information 111 in the storage unit 11.

Moreover, the display control unit 104 may control the display of the document information 111 received from the terminal 2 on the display unit of the terminal 2. In the embodiment, the document information 111 to be displayed is limited to that uploaded by the logged-in user, and the document information 111 of other users will not be displayed. However, the document information 111 of the other users may also be displayed by setting permissions.

The client may refer to the screen described above on the display unit of the terminal 2, and operate the terminal 2 to request a review of the displayed document information 111. The terminal 2 may transmit the operation content to the document creation server device 1. The client may also edit the contents of the document information 111 that is requested to be reviewed prior to requesting a review, and insert comments.

Upon receiving the operation content, the display control unit 104 of the document creation server device 1 may receive a review request. In this example, prior to transmitting a review request to the mandatary, the document creation server device 1 may inspect the document information 111 to reduce the necessity of transmitting the review request to the mandatary or to reduce the burden of the mandatary, as illustrated in "Inspection Operation", which will be described below.

The order of the operations described above may be switched, or all or some of the operations may be repeated multiple times. The operations are performed until the review request of the client or the creation of the document information 111 is completed.

Inspection Operation

Figure 9:
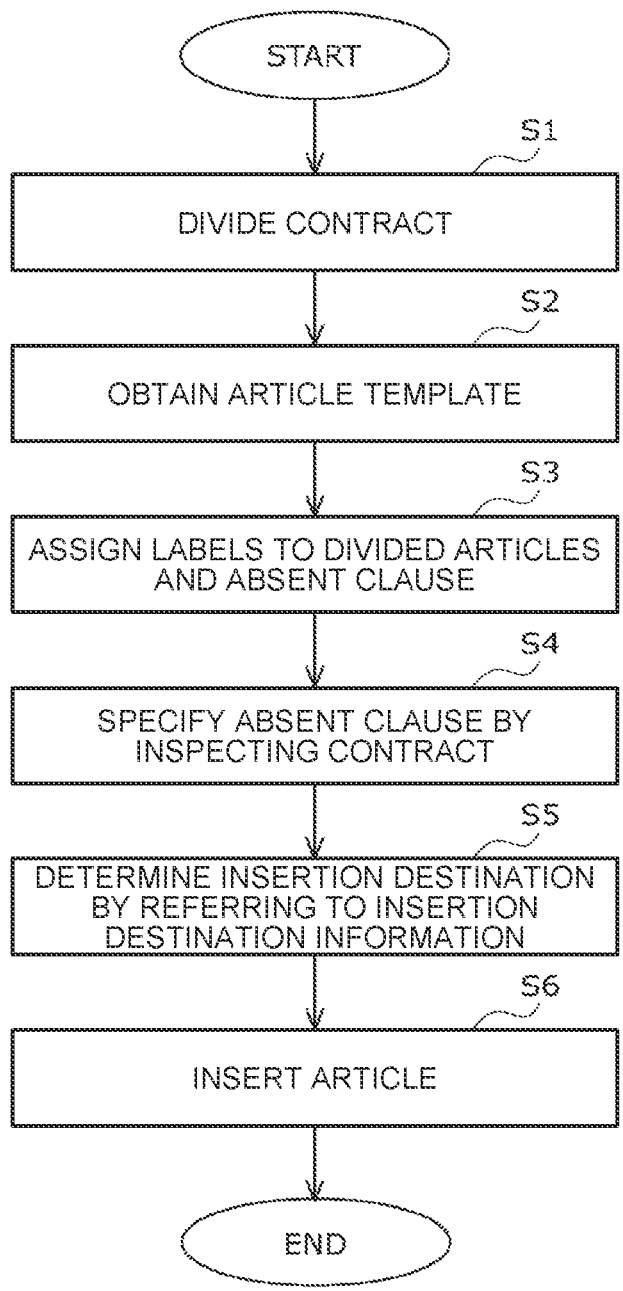
FIG. 9 is a flowchart illustrating an inspection operation of the document creation server device.

FIG. 9 is a flowchart illustrating an inspection operation of the document creation server device 1. FIG. 4 is a schematic diagram for explaining an example of the inspection operation of the document information 111.

First, the display control unit 104 of the document creation server device 1 may receive the operation content of a review request from the terminal 2. The document creation server device 1 may receive an inspection request from the terminal 2 along with the type of the contract and position.

Alternatively, the contract document inspection unit 101 may extract the type of the contract and position from the document information 111.

Next, as illustrated on the left side of FIG. 4, the contract document division unit 100 may divide the document information 111*a* into the title 100*a*, the preface 100*b*, and the article units 100*c*, 100*d*, 100*e*, 100*f*, . . . , for each component of the contract (S1). The contract document division unit 100 may also divide the target document information 111 into units of sections and items. Units suitable for the structure of the document information 111 may be used.

Next, the contract document inspection unit 101 of the document creation server device 1 may obtain the corresponding article template information 112 on the basis of the type of the contract and position (S2). As illustrated in FIG. 4, article titles 112A of the article template information 112, in which the contract type is "Non-Disclosure Agreement" and the position of the company is "Receiving side", are extracted. The items of the article titles 112A may not be limited to titles of articles, but may also be units of sections and items.

Next, the contract document inspection unit 101 of the document creation server device 1 may inspect the document information 111*a* that has been divided into article units by the contract document division unit 100. Specifically, the contract document inspection unit 101 may sequentially assign labels (Label A, Label B, Label C, . . . ) for what (check marks in FIG. 4) the article titles 112A are matched with the article units 100*c*, 100*d*, 100*e*, 100*f*, . . . (S3).

Figure 5:
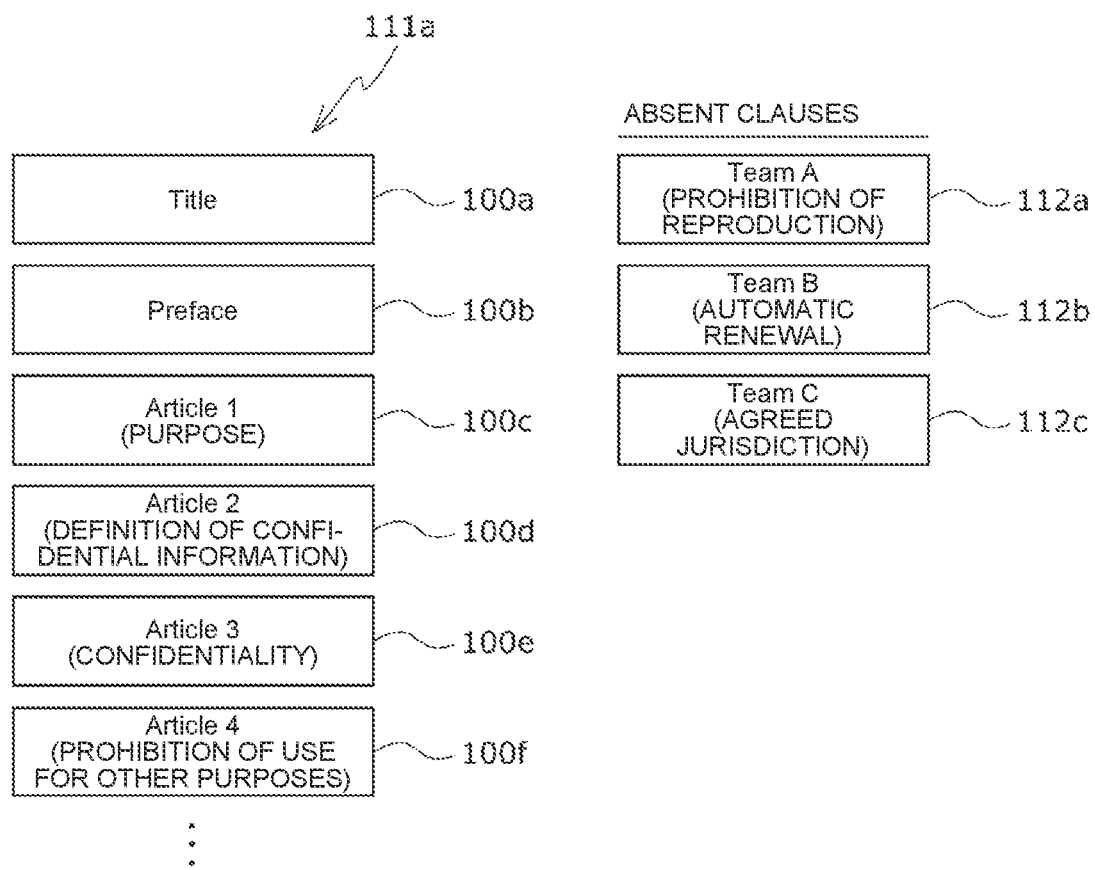
FIG. 5 is a schematic diagram illustrating absent clauses obtained as a result of the inspection operation.

FIG. 5 is a schematic diagram illustrating absent clauses obtained as a result of the inspection operation.

In FIG. 5, the document information 111*a* may be conceptually described using structural units, and the article units to which a label is not given by the inspection operation at step S3 described above, may be specified as absent clauses 112*a*, 112*b*, 112*c*, . . . (S4).

Next, the insertion destination determination unit 102 may determine the article serving as a reference when an absent clause is to be inserted, and the insertion position relative to the article serving as a reference, on the basis of the insertion destination information 113 (S5). Specifically, first, the insertion destination determination unit 102 may refer to insertion destination information 113*a* illustrated in FIG. 6, as the first insertion destination information.

FIG. 6 is a schematic diagram illustrating an example of a configuration of the insertion destination information 113.

The insertion destination information 113*a* may be information for determining the article serving as a reference when an absent clause is to be inserted. In the insertion destination information 113*a*, labels of absent clauses may be described as items in row, and labels of clauses each serving as the reference for inserting may be described as items in column. The value indicate may be the priority of insertion. The insertion destination information 113*a* may be selected on the basis of the contract type "Non-Disclosure Agreement" and the position of the company "Receiving side".

The insertion destination determination unit 102 may specify "Label G" as a clause 102*a* corresponding to the absent clause in the article titles 112A in FIG. 5. Next, as illustrated in FIG. 6, the insertion destination determination unit 102 may refer to the row in the insertion destination information 113*a* corresponding to "Label G" of the absent clause 102*a*, and specify "Label H" as a clause 102*c* that corresponds to a priority 102*b* serving as the highest "first priority", as the label of the clause serving as the reference for inserting. The insertion destination determination unit 102 may also specify a plurality of labels from the top as the clauses serving as a reference, along with the priority in addition to the highest priority label.

Next, the insertion destination determination unit 102 may refer to insertion destination information 113*b* illustrated in FIG. 7, as second insertion destination information.

FIG. 7 is a schematic diagram illustrating an example of a configuration of the insertion destination information 113.

The insertion destination information 113*b* may be information for determining the insertion position relative to the article serving as a reference. In the insertion destination information 113*b*, labels corresponding to the absent clauses may be described as items in row, and labels of the clauses each serving as the reference for inserting are described as items in column. The value may indicate the relative insertion position. The insertion destination information 113*b* may be selected on the basis of the contract type "Non-Disclosure Agreement" and the position of the company "Receiving side".

In FIG. 6, the "Label H" may be specified as the clause 102*c* serving as the reference for inserting. Hence, as illustrated in FIG. 7, while referring to the insertion destination information 113*b*, the insertion destination determination unit 102 may refer to the column corresponding to the "Label H" of a clause 102*d* serving as the reference for inserting and the row corresponding to the "Label G" of the absent clause, and specify "Below" as a relative insertion position 102*e* that corresponds to the label "Label G" corresponding to the absent clause. Note that "Below" means to insert the absent clause "below" the clause serving as a reference. Moreover, "Above" and "Mid" mean to insert the absent clause "above" and "in the middle of" the clause serving as a reference. The "Mid" may also be used to define a more detailed position in the clause.

At step S5, the insertion destination determination unit 102 may perform the operation described above as many as the number of absent clauses, and specify the insertion destination reference clause and the relative insertion position.

Figure 8:
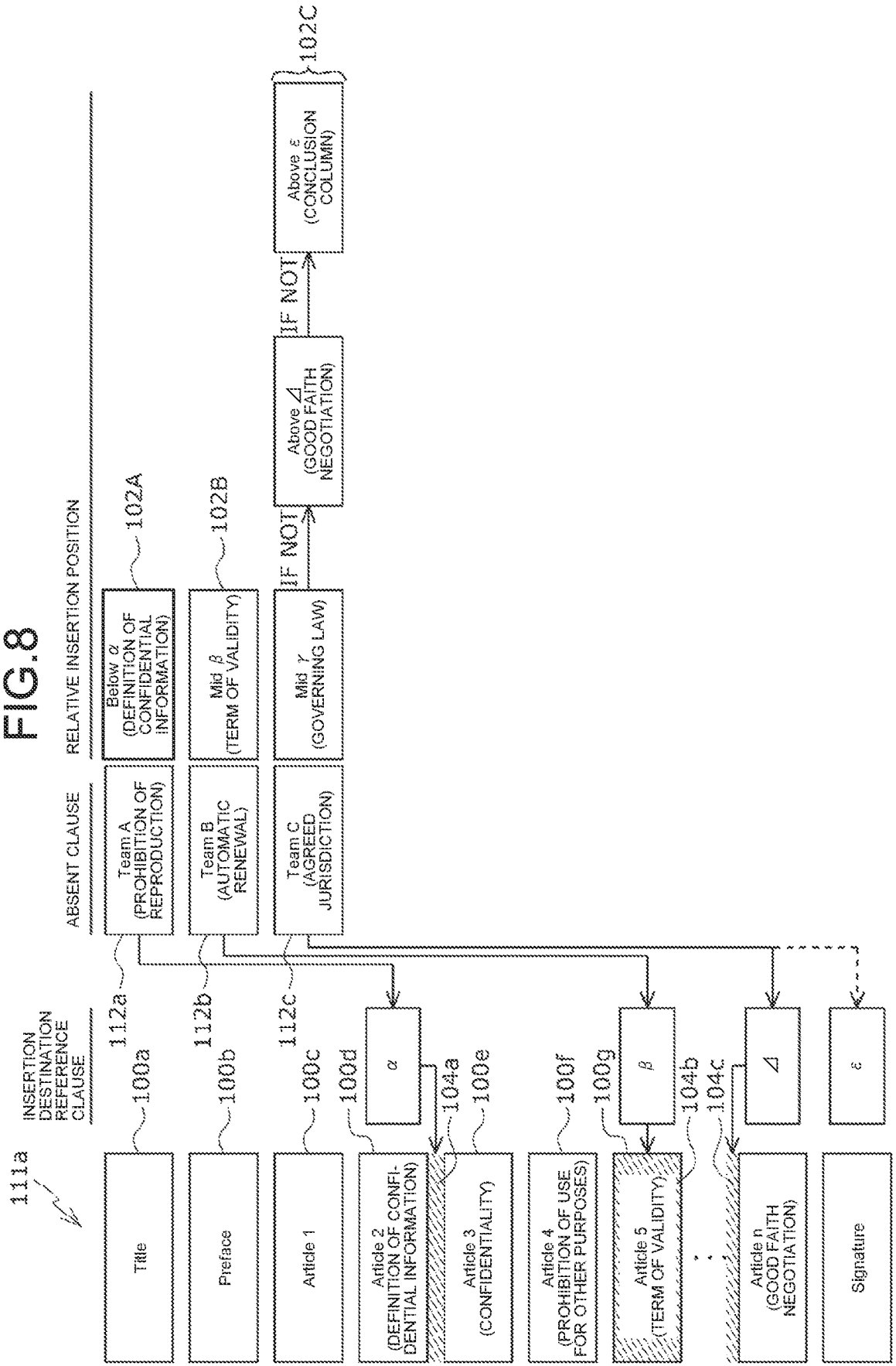
FIG. 8 is a schematic diagram for explaining an insertion operation.

FIG. 8 is a schematic diagram for explaining an insertion operation.

The insertion destination determination unit 102 may define insertion destinations 102A, 102B, and 102C (insertion destination reference clauses "α", "β", and "γ", and relative insertion positions "Below α", "Mid β", and "Mid γ IF NOT Above Δ IF NOT ε") with respect to the absent clauses 112*a*, 112*b*, and 112*c*. In the insertion destination 102C, three-stage insertion positions may be defined. If "γ (Governing Law)" is not included in the document information 111*a*, "Above Δ (Good Faith Consultation)" may be applied. If "Δ (Good Faith Consultation)" is not included in the document information 111*a*, "Above ε (Conclusion Column)" may be applied. In the display operation, which will be described next, a plurality of the three-stage insertion positions may be displayed and processed along with the priority.

Next, the display control unit 104 may control the display of insertion destination candidates 104*a*, 104*b*, and 104*c* along with the contents of the document information 111*a* (or the conceptual display of the structural units of the document information 111*a*) on the basis of the insertion destinations 102A, 102B, and 102C described above, and display the insertion destination candidates 104*a*, 104*b*, and 104*c* on the display unit of the terminal 2. The client may check the display contents on the terminal 2, and if the client wishes to insert one of the insertion destination candidates 104*a*, 104*b*, and 104*c*, the client may operate the terminal 2 to select, for example, the insertion destination candidate 104*a*. The terminal 2 may transmit the operation content to the document creation server device 1. The display control unit 104 may also present the display contents described above to the mandatary, by controlling the display of the display unit of the terminal 3.

Upon receiving the operation content from the terminal 2, the article insertion unit 103 of the document creation server device 1 may insert the absent clause in the insertion position determined by the insertion destination determination unit 102 (the article serving as a reference "Label H", and the relative insertion position "Below") (S6). That is, the article insertion unit 103 may insert the absent clause "Prohibition of Reproduction", "below" the article "Prohibition of Use for Other Purposes" that corresponds to the "Label H".

With the embodiment described above, the contents of the document information 111 may be extracted and divided into article units, an absent clause may specified according to the contents, the article serving as the reference for inserting may be specified according to the relation between the absent clause and the existing clause, and the relative insertion position may be specified according to the article serving as a reference. Hence, if there is missing information in the document information 111, it is possible to present information indicating where the missing information should be inserted.

Other Embodiments

The present invention is not limited to the embodiment described above, and various modifications may be made.

For example, the document information 111 is not limited to contracts. The present invention is similarly applicable to a law document itself, user manual, and the like, as long as the document information 111 can be divided into components. Moreover, the components are not limited to articles, sections, or items, but may be words, letters, and symbols, or may be paragraphs and text.

In the embodiment described above, the functions of the units 100 to 104 of the control unit 10 are implemented by a computer program. However, all or part of the units may also be implemented by hardware such as an application-specific integrated circuit (ASIC). Moreover, the computer program used in the embodiment described above may be provided by storing the computer program in a recording medium such as a compact disc read-only memory (CD-ROM). Furthermore, replacement, deletion, addition, and the like of the above-mentioned steps described in the above embodiment are possible within a range that does not change the gist of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

INDUSTRIAL APPLICABILITY

The present disclosure provides a document creation method and an information processing device that, if there is missing information in a document, present information indicating where the missing information should be inserted.

What is claimed is:

1. A document creation method comprising:
   dividing computer-readable document information associated with a document into units;
   specifying a missing unit in the document information divided into units;
   specifying a unit serving as a reference for inserting the missing unit; and
   determining a relative insertion position in the document information for inserting the missing unit based on the unit serving as the reference and the missing unit.

2. The document creation method according to claim 1, wherein
   the unit serving as the reference for inserting the missing unit is specified by referring to first insertion destination information in which the unit serving as the reference for inserting is defined in a relation between the missing unit and the units included in the document information, and
   the relative insertion position in which the missing unit is to be inserted is determined by referring to second insertion destination information in which the relative insertion position is defined according to a relation between the unit serving as the reference and the missing unit.

3. The document creation method according to claim 2, wherein
   the first insertion destination information is information in which insertion priorities of units each serving as the reference for inserting are defined in the relation with the units included in the document information, and
   the unit serving as the reference for inserting the missing unit is specified according to the insertion priorities, by referring to the first insertion destination information.

4. The document creation method according to claim 3, wherein
   a plurality of units each serving as the reference for inserting are specified based on the insertion priorities, by referring to the first insertion destination information, and relative insertion positions, each defined according to one of the plurality of units, each serving as the reference for inserting, are determined, and
   the document creation method further comprises displaying combinations of the plurality of units each serving as the reference and the relative insertion positions.

5. The document creation method according to claim 1, further comprising receiving a selection of the unit serving as the reference and the relative insertion position, and inserting the missing unit according to the selected unit serving as the reference and the relative insertion position.

6. The document creation method according to claim 1, wherein the specifying the missing unit includes assigning labels to the units into which the document information is divided.

7. The document creation method according to claim 6, wherein a unit to which a label is not assigned is specified as the missing unit.

8. The document creation method according to claim 6, further comprising proposing a unit to be inserted as the missing unit.

9. An information processing device comprising:
   a processor configured to:
     divide computer-readable document information associated with a document into units;
     specify a missing unit in the document information divided into units;
     specify a unit serving as a reference for inserting the missing unit; and
     determine a relative insertion position in the document information for inserting the missing unit based on the unit serving as the reference and the missing unit.

10. The information processing device according to claim 9, wherein the processor is further configured to:
    specify the missing unit, by referring to first insertion destination information in which the unit serving as the reference for inserting is defined in a relation between the missing unit and the units included in the document information, and
    wherein the relative insertion position in which the missing unit is to be inserted is determined by referring to second insertion destination information in which the relative insertion position is defined according to a relation between the unit serving as the reference and the missing unit.

11. The information processing device according to claim 10, wherein
    the first insertion destination information is information in which insertion priorities of units each serving as the reference for inserting are defined in the relation with the units included in the document information, and
    the processor is configured to specify the unit serving as the reference for inserting the missing unit according to the insertion priorities, by referring to the first insertion destination information.

12. The information processing device according to claim 11, wherein the processor is further configured to:
    specify a plurality of units each serving as the reference for inserting based on the insertion priorities, by referring to the first insertion destination information;
    determine relative insertion positions each defined according to one of the plurality units each serving as the reference for inserting; and
    display combinations of the plurality of units each serving as the reference and the relative insertion positions.

13. The information processing device according to claim 9, wherein the processor is further configured to receive a selection of the unit serving as the reference and the relative insertion position, and insert the missing unit according to the selected unit serving as the reference and the relative insertion position.

14. The information processing device according to claim 9, wherein the processor is configured to assign labels to the units into which the document information is divided, to specify the missing unit.

15. The information processing device according to claim 14, wherein the processor is configured to specify, as the missing unit, a unit to which a label is not assigned.

16. The information processing device according to claim 14, wherein the processor is further configured to propose a unit to be inserted as the missing unit.

17. A document creation method comprising:
    dividing computer-readable document information associated with a document into units, the units including article units;
    assigning labels to the article units, to specify an absent clause in document information; and
    determining a relative insertion position in the document information for inserting the absent clause based on the labeled article units.

18. The document creation method according to claim 17, wherein an article unit to which a label is not assigned is specified as the absent clause.

19. The document creation method according to claim 17, further comprising proposing a clause to be inserted as the absent clause.

20. A non-transitory computer-readable medium including programmed instructions that cause a computer to execute a document creation process comprising:
- dividing computer-readable document information associated with a document into units;
- specifying a missing unit in the document information divided into units;
- specifying a unit serving as a reference for inserting the missing unit; and
- determining a relative insertion position in the document information for inserting the missing unit based on the unit serving as the reference and the missing unit.

\* \* \* \* \*